United States Patent [19]
Hohmann et al.

[11] Patent Number: 5,201,552
[45] Date of Patent: Apr. 13, 1993

[54] TWIN HOSE COUPLING

[75] Inventors: Ralf Hohmann; Ralf Spors, both of Bruchköbel; Gerhard Winterstein, Bab Vilbel, all of Fed. Rep. of Germany

[73] Assignee: Rasmussen GmbH, Maintal, Fed. Rep. of Germany

[21] Appl. No.: 788,830

[22] Filed: Nov. 7, 1991

[30] Foreign Application Priority Data

Nov. 23, 1990 [DE] Fed. Rep. of Germany ....... 4037308

[51] Int. Cl.$^5$ ............................................. F16L 39/02
[52] U.S. Cl. .................................. 285/137.1; 285/131; 285/308
[58] Field of Search ...................... 285/137.1, 131, 301, 285/28, 238, 308

[56] References Cited

U.S. PATENT DOCUMENTS

| | | | |
|---|---|---|---|
| 3,038,224 | 6/1962 | Kulberg et al. | 285/137.1 |
| 3,125,359 | 3/1967 | Charles | 285/137.1 |
| 3,751,076 | 8/1973 | Thais et al. | 285/137.1 |
| 3,757,824 | 9/1973 | Parkhurst et al. | 285/137.1 |
| 3,822,903 | 7/1974 | McNeely et al. | 285/137.1 |
| 3,937,498 | 2/1976 | Weinhold | 285/137.1 |
| 4,116,476 | 9/1978 | Porter et al. | 285/137.1 |
| 4,478,436 | 10/1984 | Hashimoto | 285/137.1 |
| 4,753,268 | 6/1988 | Palau | 285/137.1 |
| 4,834,825 | 5/1989 | Adams et al. | 285/137.1 |
| 4,893,845 | 1/1990 | Bartholomew | 285/137.1 |
| 4,929,002 | 5/1990 | Sauer | 285/319 |

FOREIGN PATENT DOCUMENTS

| | | |
|---|---|---|
| 3529052 | 2/1987 | Fed. Rep. of Germany . |
| 3903565 | 8/1990 | Fed. Rep. of Germany . |
| 2127925 | 4/1984 | United Kingdom ............. 285/137.1 |

*Primary Examiner*—Eric K. Nicholson
*Attorney, Agent, or Firm*—Peter K. Kontler

[57] ABSTRACT

A device for simultaneously coupling two pipes with two hoses has a discrete tubular connector for each hose, and each connector has flexible arms with pallets which can engage external retainers on the pipes. The connectors are more or less permanently secured to the respective hoses and are separably connected to each other by a flexible holder having C-shaped collars receivable in external grooves of the connectors and one or more flexible webs which connect the collars to each other. The flexible holder compensates for eventual departure of the distance between the pipes from an optimum distance and/or for absence of exact parallelism of the pipes with one another. When a connector is separated from the holder, it can be used as a constituent of a simple hose coupling, namely to connect the end portion of a hose to a nipple, to a pipe or another tubular component.

20 Claims, 4 Drawing Sheets

TWIN HOSE COUPLING

BACKGROUND OF THE INVENTION

The invention relates to coupling devices in general, and more particularly to coupling devices which can be utilized to separably connect terminal portions of first tubular components (e.g., nipples at the ends of pipes or tubes) with terminal portions of second tubular components (e.g., end portions of flexible hoses). Still more particularly, the invention relates to improvements in devices which can separably couple the terminal portions of at least two first tubular components with the terminal portions of at least two second tubular components.

German patent application No. 39 03 565 of Feichtiger et al. (published Aug. 9, 1990) discloses a twin coupling wherein two interconnected tubular coupling members are insertable into mutually inclined sockets of a receptacle and the receptacle is provided with a cutting edge which is located between the two sockets to sever a web between the coupling members while the coupling members are being inserted into the respective sockets. Such coupling can be used only when its parts are machined and/or otherwise formed with a relatively high degree of accuracy. Therefore, the coupling of Feichtiger at al. cannot be put to use as a dual or multiple hose coupling in a motor vehicle wherein the end portions of several hoses must be separably but sealingly connected to discrete nipples if the mutual spacing of the nipples and/or the mutual spacing of the tubular connectors deviates from a predetermined value. For example, the heat exchangers of heaters in motor vehicles often comprise several nipples each of which is to be connected to the end portion of a discrete hose, and it would be of advantage to provide a device which could be manipulated to simultaneously connect two or more hoses to two or more nipples as well as to permit preferably individual disconnection of each hose from the respective nipple. The principle underlying the invention of Feictiger et al. could be relied upon if the mutual spacing of nipples were to correspond, with a rather high degree of accuracy, to the mutual spacing of two or more tubular connectors for the end portions of discrete hoses.

A coupling which can be used to separably connect a single hose to a nipple or the like is disclosed in commonly owned U.S. Pat. No. 4,929,002 granted May 29, 1990 to Sauer for "Device for coupling a hose to a pipe". Such coupling can be utilized under the hood of or elsewhere in a motor vehicle. However, it is necessary to provide a discrete coupling for each hose which is to be separably secured to a nipple or the like.

Another hose coupling which can be used in a motor vehicle is disclosed in commonly owned copending patent application Ser. No. 07/591,562 of Spors et al., now U.S. Pat. No. 5,074,061 granted Dec. 24, 1991. This hose coupling is also designed to separably connect the end portion of a first hose with the end portion of a second hose or with the end portion of another tubular component.

German patent application No. 35 29 052 of Wolf et al. (published Feb. 26, 1987) discloses a device which can couple several hoses with discrete additional hoses or other tubular components. The device of Wolf et al. comprises a discrete tubular connector for each pair of hoses to be separably coupled to each other and a flexible web which is integral with the tubular connectors. An advantage of the flexible web is that it can compensate for deviations of the actual distance of neighboring fixedly mounted tubular components (e.g., nipples at the ends of two or more pipes) from a prescribed standard or optimum distance. This is desirable when the coupling device is used in assembly plants for motor vehicles wherein two or more flexible hoses must be separably hut sealingly coupled with an equal number of nipples or the like.

OBJECTS OF THE INVENTION

An object of the invention is to provide a novel and improved device which can separably couple several first tubular components with an equal number of second tubular components in such a way that each first tubular component can be separated from or connected to the corresponding second tubular component independently of or jointly with the other components.

Another object of the invention is to provide a multiple hose coupling or an analogous coupling device which is more versatile than heretofore known coupling devices.

A further object of the invention is to provide a coupling device which can be utilized in motor vehicles or elsewhere to separably connect two or more hoses to two or more rigidly installed pipes or tubes irrespective of whether or not the mutual spacing of the rigidly installed pipes or tubes corresponds to a desired or optimal spacing.

An additional object of the invention is to provide the above outlined coupling device with novel and improved means for facilitating rapid disengagement of a first set of tubular components from the tubular components of a second set.

Still another object of the invention is to provide the above outlined coupling device with novel and improved means for permitting separation of discrete first tubular components from the corresponding second tubular components.

A further object of the invention is to provide a novel and improved method of manipulating the above outlined coupling device.

Another object of the invention is to provide a coupling device which exhibits all advantages of presently preferred simple hose couplings.

An additional object of the invention is to provide the above outlined coupling device with novel and improved means for separably securing its parts to each other.

A further object of the invention is to provide a simple and inexpensive coupling device which can be mass produced in available machines and is designed for installation by robots in assembly plants for motor vehicles or elsewhere.

SUMMARY OF THE INVENTION

The invention is embodied in a device for separably coupling terminal portions of a first set of tubular components (for example, the nipples of pipes or tubes) with terminal portions of a second set of tubular components (for example, the end portions of flexible hoses), one for each component of the first set. The improved coupling device comprises tubular connectors, one for each component of the first set and the respective component of the second set, and a flexible holder for the connectors. The holders and the connectors have means for separably securing the holder to at least one of the connectors.

The holder can comprise a discrete collar for each connector, and each collar preferably extends along an arc of at least 180°. The holder preferably further comprises at least one flexible uniting member which connects the collars to each other. The collars are preferably deformable and are preferably designed to be applied around the respective connectors by snap action. The securing means includes first sections on the connectors and second sections on the collars. Each collar can constitute a substantially C-shaped part, and the at least one uniting member can constitute an arcuate web.

Each set can comprise two components, and the holder then comprises two collars and preferably two uniting members.

The collars have pairs of end portions, and each end portion of one of a pair of collars confronts and is adjacent an end portion of the other collar of such pair of collars. The end portions of the collars form part of the securing means, i.e, they can constitute the respective section of the securing means.

The collars can be disposed in a common plane and the collars of a pair of collars in a device for coupling the terminal portions of two first tubular components to the terminal portions of two second tubular components can be substantial or exact mirror images of each other.

The at least one uniting member is or can be rigid (particularly integral) with the collars.

The peripheral surfaces of the connectors can be provided with circumferentially extending grooves for the respective collars. The outer diameter of each connector can vary gradually from one end toward the respective groove. At least one groove can extend along an arc of less than 360°, for example, along an arc which is a relatively small fraction of 360°.

The securing means can include first sections having stops on the connectors and the aforementioned end portions of the collars can constitute second sections of such securing means. The end portions of the collars abut the respective connectors when the collars are applied around such connectors. The sections of at least one of the first and second sections can include ramps which extend in substantial parallelism with the axes of the tubular connectors when the collars of the holder are secured to the respective connectors. The collars are deformable to enable their end portions to ride over the respective stops in response to angular displacement of the connectors and the respective collars relative to each other whereby the sections of the other of the first and second sections and the ramps move relative to each other in the circumferential direction of the connectors.

The first components are preferably provided with external retainers, particularly in the form of ring-shaped beads or ribs, and the connectors are then provided with flexible arms having pallets which serve to engage the retainers in response to insertion of the terminal portion of each first component into the respective connector. For example, each connector can be provided with two elastically deformable arms which are disposed substantially diametrically opposite each other. The pallets preferably extend radially inwardly from the free ends of the respective arms.

Each connector can further comprise an elastically deformable ring which connects the ends of the respective arms and each ring has an oval internal surface including two first portions which are adjacent the respective pallets and are spaced apart from each other a first distance less than the outer diameter of a retainer in undeformed condition of the ring. Each internal surface further includes two second portions which are located opposite each other and are angularly offset (e.g., by 90°) relative to the respective first portions and are spaced apart from each other a second distance exceeding the outer diameter of a retainer in undeformed condition of the respective ring.

The coupling device can further comprise a preferably elongated annular deforming member for each connector. Each deforming member can be installed between the arms of the respective connector and is movable transversely of such connector between a first position in which the pallets of the respective arms are spaced apart a distance greater than the outer diameter of a retainer and a second position in which the respective arms are free to move their pallets nearer to each other so that the pallets can engage the respective retainers. Each deforming member can be provided with two external cam faces engageable with the respective arms, and with two external abutments which engage the respective arms in the second positions of the deforming members. The deforming members preferably further comprise pairs of substantially parallel external guide faces between the respective abutments and the respective cam faces.

The novel features which are considered as characteristic of the invention are set forth in particular in the appended claims. The improved coupling device itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
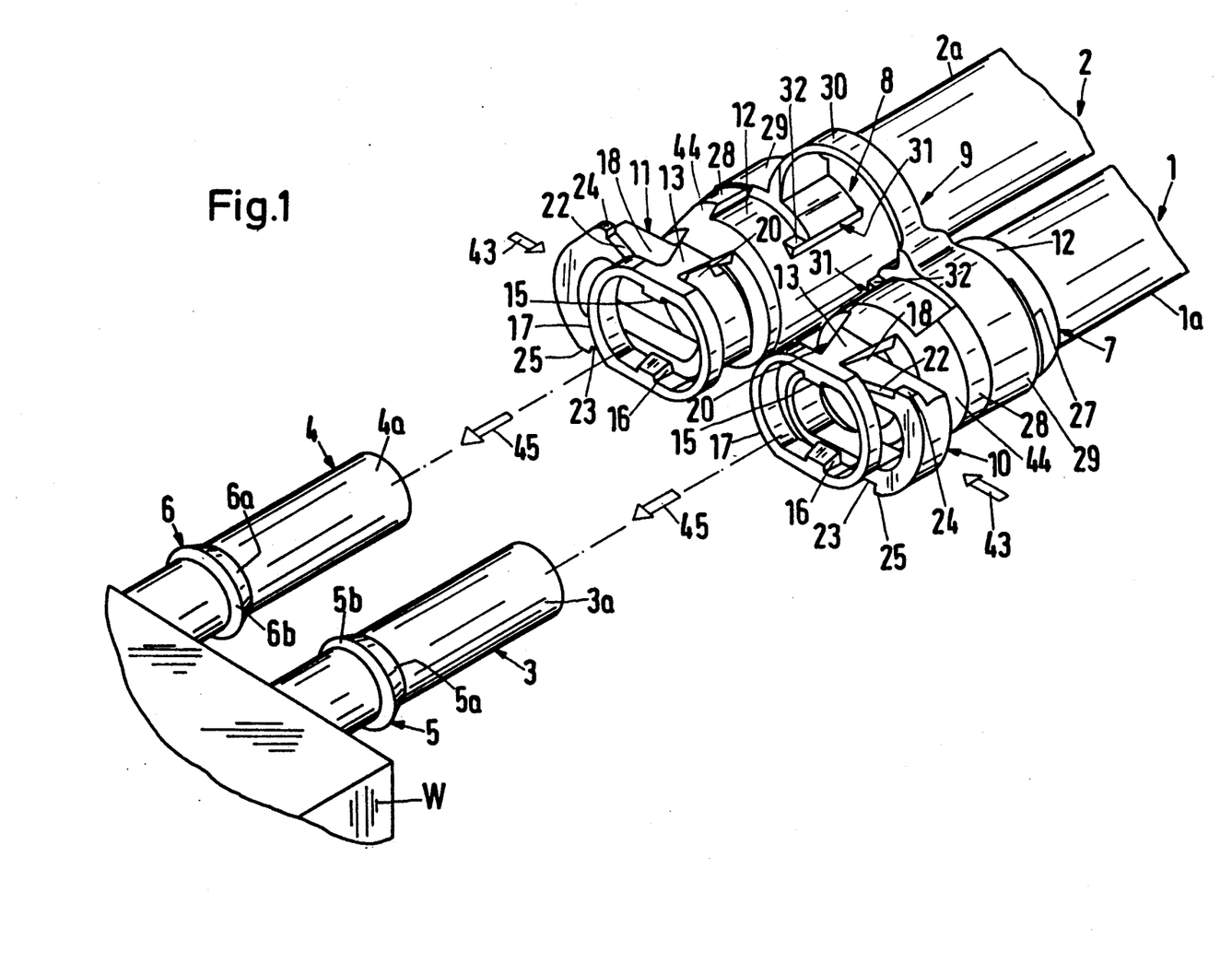
FIG. 1 is a perspective view of a coupling device which embodies one form of the invention and is separably connected with the terminal portions of two hoses preparatory to connection to the terminal portions of two rigidly installed pipes or tubes.

Referring first to FIG. 1, there is shown a coupling device which can be termed a twin hose coupling and serves to separably but sealingly connect the terminal portions 3a, 4a of a first set of tubular components 3, 4 with the terminal portions 1a, 2a of a second set of tubular components 1, 2. The tubular components 1 and 2 are hoses, and the tubular components 3, 4 are pipes or tubes whose terminal portions 3a, 4a can be said to constitute nipples. The illustrated tubes or pipes 3, 4 (hereinafter called pipes for short) are integral with the housing or casing of a heat exchanger W forming part of a heating system in a motor vehicle. The pipes 3, 4 are respectively provided with external annular retainers 5, 6 in the form of ribs each of which has a conical flank 5a, 6a and a radially extending flank 5b, 6b.

Figures 2, 3, 4, 5:
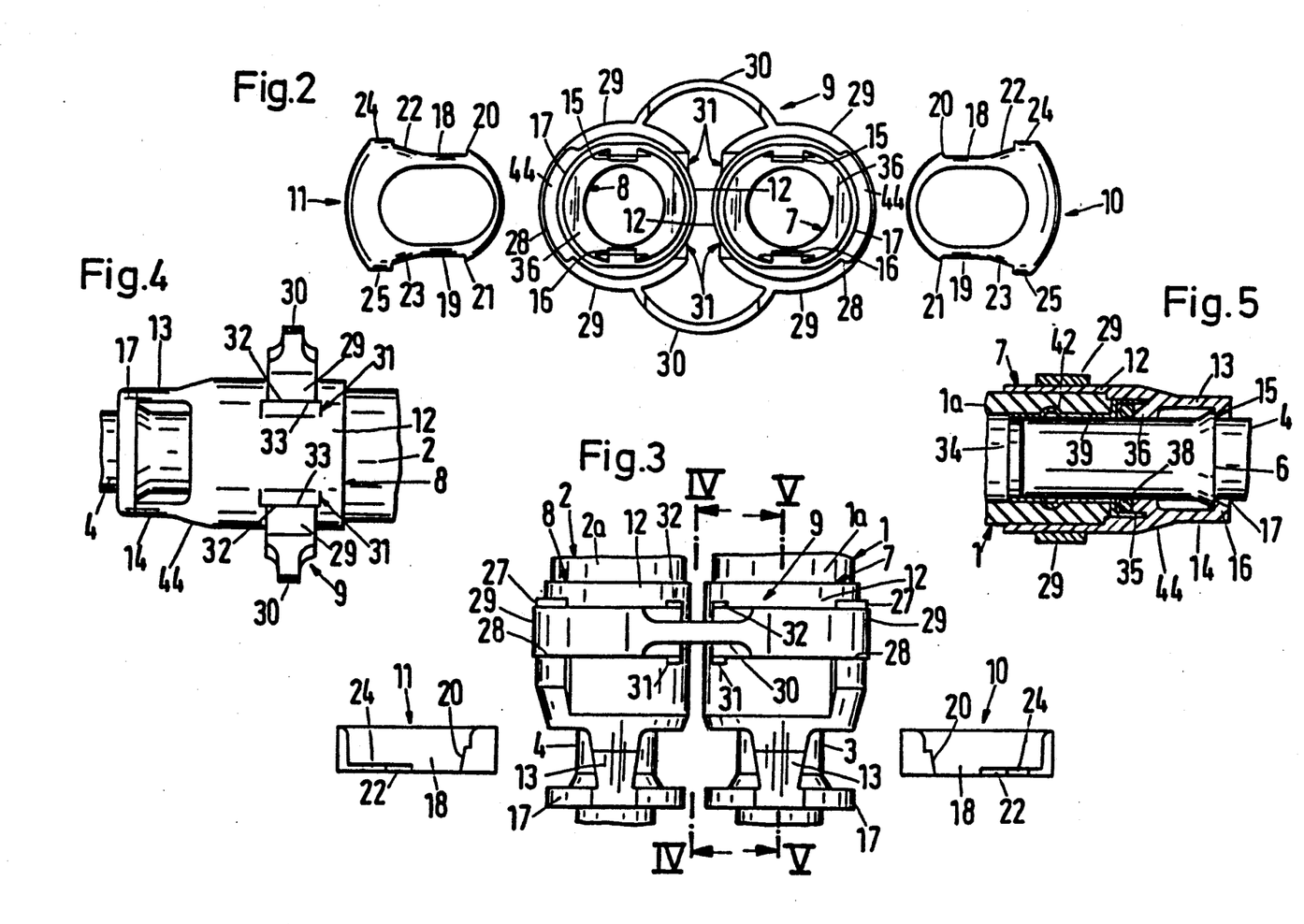
FIG. 2 is a front elevational view of the coupling device which is shown in FIG. 1, the disengaging members being shown adjacent the respective connectors.
FIG. 3 is a plan view of the structure of FIG. 2, and further showing portions of the two hoses.
FIG. 4 is a sectional view substantially as seen in the direction of arrows from the line IV—IV in FIG. 3.
FIG. 5 is a sectional view substantially as seen in the direction of arrows from the line V—V in FIG. 3.

The coupling device comprises two preferably identical elongated tubular connectors 7, 8 which are made of a suitable plastic material, two relatively thin metallic sleeves 34 (one shown in FIG. 5), two annular sealing elements 38 (e.g., in the form of O-rings one of which is shown in FIG. 5), a flexible holder 9 of plastic material, and two elongated annular deforming members 10, 11 of metallic or plastic material.

Figure 11:
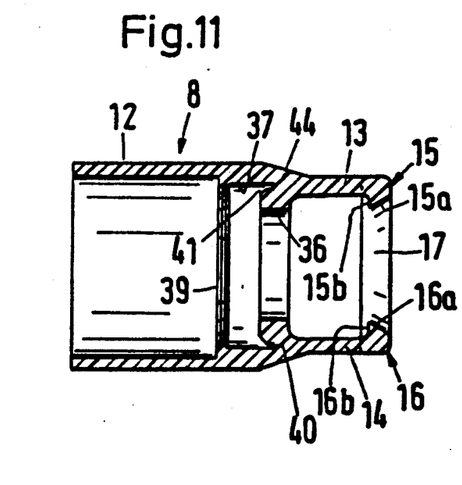
FIG. 11 is a sectional view substantially as seen in the direction of arrows from the line XI—XI in FIG. 9.

Each of the two tubular connectors 7, 8 comprises a first portion 44 (see particularly FIG. 5) and a cylindrical second portion 12. The first portion 44 is integral with two elastically deformable elongated extensions or arms 13, 14 having free end portions remote from the portion 44 and being provided with radially inwardly extending pallets 15, 16 in the form of teeth each having a conical front flank 15a, 16a (FIG. 11) and a radially extending rear flank 15b, 16b. The illustrated extensions or arms 13, 14 (hereinafter called arms) are preferably mirror images of each other, i.e., they are disposed diametrically opposite each other with reference to a plane which includes the axis of the respective connector, and each of these arms extends in parallelism with the axis of the respective connector in a direction away from the cylindrical second portion 12.

Each of the connectors 7, 8 further comprises an elastically deformable connecting ring 17 which is integral with the free ends of the respective arms 13, 14 at their pallets 15, 16 (see also FIGS. 2-4 and 9-12) and has an oval internal surface (FIG. 1). The internal surface of each ring 17 has two first portions which are located diametrically opposite each other and are spaced apart from each other a distance which is less than the maximum diameter of a retainer 5 or 6. Furthermore, the internal surface of each ring 17 includes two second portions which are also located diametrically opposite each other, which are angularly offset from the first portions by approximately or exactly 90°, and which are spaced apart from one another a distance exceeding the maximum diameter of the retainer 5 or 6. All this applies when the arms 13, 14 (and hence the respective rings 17) are not deformed. The first portions of the oval internal surfaces of the rings 17 are located at the respective pallets 15, 16. The minimal distance between the pallets 15, 16 in undeformed condition of the respective arms 13, 14 is slightly less than the maximum diameter of a retainer 5 or 6; this enables the conical front flanks 15a, 16a of the pallets 15, 16 to ride over the conical flanks 5a, 6a of the retainers 5, 6 during introduction of the nipples 3a, 4a into the cylindrical portions 12 of the respective connectors 7, 8 and the radial flanks 15b, 16b thereupon snap behind the radial flanks 5b, 6b in order to establish a separable connection between the connectors 7, 8 and the pipes 3, 4.

The annular deforming members 10, 11 are elongated (see FIGS. 1 and 2) and are slidable transversely of the respective connectors 7, 8 in and counter to the directions indicated by arrows 43 (FIG. 1). The deforming member 10 is disposed between the arms 13, 14 of the connector 7, and the deforming member 11 is disposed between the arms 13, 14 of the connector 8. FIG. 1 shows the deforming members 10, 11 in operative positions but FIGS. 2 and 3 show such deforming members in inoperative positions away from the respective arms 13, 14 for the sake of clarity.

Each of the two deforming members 10, 11 is movable relative to the respective connector 7, 8 between a first end position in which its external shoulders 20, 21 abut the respective arms 13, 14 and a second end position in which the respective arms 13, 14 are moved apart (to disengage the pallets 15, 16 from the retainer 5 or 6) by two external cam faces or ramps 22, 23. The cam faces 22, 23 are adjacent external stops 24, 25 which limit the extent of movability of the deforming members 10, 11 to their second end positions. Each of these deforming members further comprises two substantially or exactly parallel external guide faces 18, 19 one of which extends between the shoulder 20 and the cam face 22 and the other of which extends between the shoulder 21 and the cam face 23. The guide faces 18, 19 slide along the inner sides of the respective arms 13, 14 during movement of the respective deforming member 10 or 11 between its two end positions. The elongated openings of the deforming members 10, 11 surround and are movable transversely of the nipples 3a, 4a when such nipples are properly received in the respective connectors 7, 8.

Figure 12:
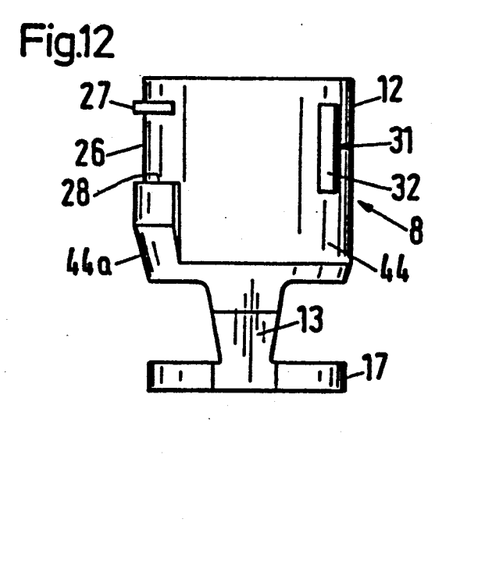
FIG. 12 is a plan view of the connector which is shown in FIG. 9.

The external surface of the cylindrical portion 12 of each connector 7, 8 is provided with a circumferential groove 26 (see particularly FIG. 12) which extends along an arc of less than 360°. One side of the groove 26 is flanked by a narrow rib 27 and the other side is flanked by a wider rib 28. The outer diameter of each connector 7, 8 increases gradually from one end toward the respective groove 26, and the maximum diameter equals or approximates twice the maximum radial distance of the rib 27 or 28 from the axis of the respective connector. FIG. 12 shows that the external surface of the connector 8 which is shown therein includes a conical portion 44a sloping toward the peripheral surface of the rib 28.

Figure 7:
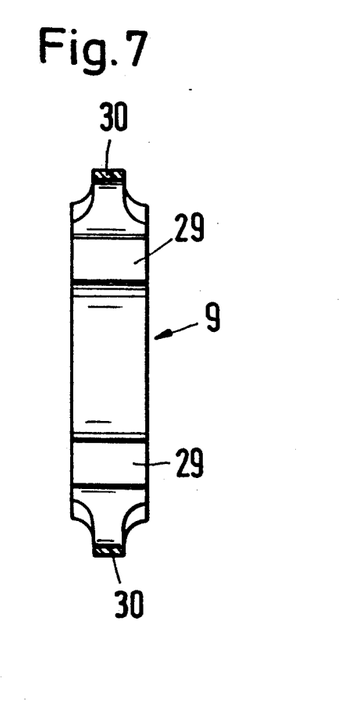
FIG. 7 is a sectional view substantially as seen in the direction of arrows from the line VII—VII of FIG. 6.
Figure 8:
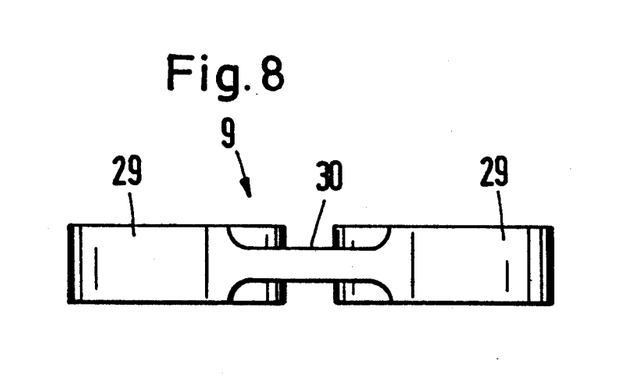
FIG. 8 is a plan view of the holder of FIGS. 6 and 7.
Figure 9:
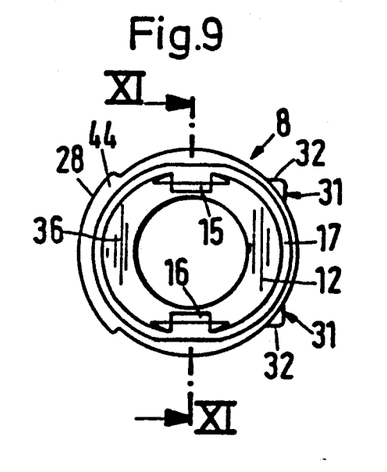
FIG. 9 is a front elevational view of a connector in the coupling device of FIGS. 1 to 3.
Figure 10:
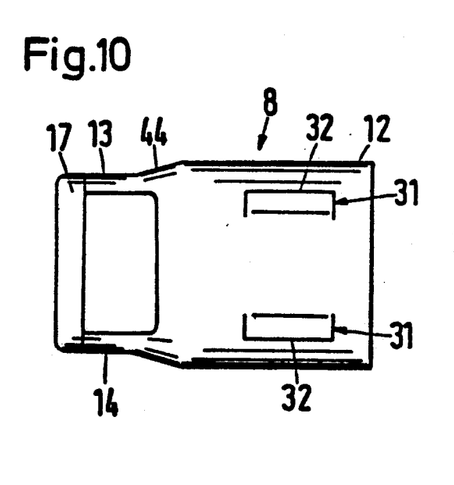
FIG. 10 is a side elevational view of the connector as seen from the right-hand side of FIG. 9.

The holder 9 of the improved coupling device comprises two substantially C-shaped flexible collars or clamps 29 (see particularly FIGS. 6 to 8) which are mirror images of each other with reference to a plane extending between their end portions 33, and the holder 9 further comprises two flexible arcuate uniting members or webs 30 each of which is integral with the collars 29 and which are also mirror images of each other in undeformed condition of the holder. The collars 29 are located in a common plane, the same as the uniting members 30. Each collar 29 extends along an arc well in excess of 180°, and the entire holder 9 can be made of a suitable synthetic thermoplastic material.

When the holder 9 is properly coupled with the connectors 7 and 8, the central portions of the collars 29 are confined in the grooves 26 of the respective cylindrical portions 12 and the free end portions 33 of such collars abut the substantially tangentially extending cam faces or ramps 32 of stops 31 which are provided at the exterior of the respective cylindrical portions 12. The end portions 33 can be said to constitute first sections, and the stops 31 can be said to constitute second sections, of means for separably securing the collars 29 of the holder 9 to the cylindrical portions 12 of the respective connectors 7, 8. The collars 29 are elastically deformable; therefore, their end portions 33 can be spread apart to facilitate application to the respective connector and introduction of median portions of the collars into the respective grooves 26. The end portions 33 are then free to move toward the respective cylindrical portions 12 by snap action and to engage the ramps 32 of the respective stops 31 (FIGS. 2, 3 and 4).

The stops 31 prevent unintentional turning of the connectors 7, 8 relative to the respective collars 29. However, if a person in charge applies a force which suffices to elastically deform the collars 29, the end portions 33 of the corresponding collar 29 are caused to ride along and beyond the respective ramps 32 to permit a change in the angular position of the connector 7 or 8 relative to the nipple 3a or 4a. The ramps 32 are elongated and extend in parallelism with the axes of the respective cylindrical portions 12. The inclination of the end portions 33 of the collars 29 is preferably complementary to that of the respective ramps 32, i.e., the end portions 33 can be said to constitute ramps which yield in response to turning of the cylindrical portions 12 relative to the respective collars 29 so that the stops 31 can ride over the end portions 33 if the torque which is applied to the connector 7 or 8 suffices to cause its rotation relative to the respective nipple 3a, 4a.

FIG. 5 shows the manner in which the terminal portion 1a of the hose 1 is more or less permanently and sealingly coupled to the connector 7. This coupling is similar to that which is described in commonly owned copending patent application Ser. No. 07/788,822 filed Nov. 7, 1991 by Hohmann et al. for "Hose Coupling". The sleeve 34 is made of a preferably ductile metallic material and includes a smaller-diameter section 39 and a larger-diameter section 35. The latter is located in the portion 44 of the connector 7 adjacent the end face of the terminal portion 1a which latter is clamped between the cylindrical portion 12 and the smaller-diameter section 39. To this end, the section 39 is provided with at least one circumferentially complete corrugation 42 which can be applied by one or more rollers subsequent to assembly of the connector 7, sleeve 34 and terminal portion 1a. The free end of the larger-diameter section 35 extends into an annular socket or groove 40 (see particularly FIG. 11) of the portion 44. More specifically, the socket 40 is provided in an internal annular wall 36 of the portion 44 and its open end faces toward the cylindrical portion 12 and is bounded from within by a conical guide face 41. The portion 44 of the connector further comprises an internal annular protuberance or rib 39 (FIG. 11) having an inner diameter which is slightly smaller than the outer diameter of the larger-diameter section 39 of the sleeve 34. The O-ring 38 is surrounded by the section 35 and is located in an annular recess 37 between the internal wall 36 and the internal protuberance 39 of the respective portion 44.

When the larger-diameter section 35 of the sleeve 34 is inserted into the connector 7 of FIG. 5, it must undergo a certain amount of (radially inward) deformation and/or the protuberance 39 must expand to a certain extent in order to enable the section 35 to advance through and beyond the protuberance 39 and to introduce its free end into the socket 40. If the free end of the section 35 is deformed during advancement through the protuberance 39, it is expanded again by the conical guide face 41 at the open end of the socket 40. The length of the section 35 is preferably selected in such a way that the entire section 35 is located to the right of the protuberance 39 when the free end of such section is properly received in the socket 40.

The smaller-diameter section 39 of the sleeve 34 can be provided with one, two or more corrugations 42, depending on the desired clamping action upon the terminal portion 1a of the hose 1. As mentioned above, the corrugation or corrugations 42 can be formed by one or more rollers. It is also possible to employ a rubber ring and a conical spreading tool which is driven into the rubber ring. Once the making of the corrugation or corrugations 42 is completed, and once the shoulder between the sections 35, 39 of the sleeve 34 is located between the wall 36 and the protuberance 39 of the portion 44 of the connector 7 of FIG. 5, extraction of the terminal portion 1a of the hose 1 from the annular space between the cylindrical portion 12 and the section 39 necessitates the exertion of a large force. The free end of the larger-diameter section 35 of the sleeve 34 is preferably a short cylinder prior to introduction into and advancement beyond the protuberance 39 and again upon advancement beyond the conical guide face 41, i.e., into the socket 40 of the internal wall 36. The parts 7, 34, 38 and 1a are then ready to be assembled with the terminal portion 3a of the pipe 3, i.e., the terminal portion 3a is introduced between the arms 13, 14 and thereupon into the portion 44 so that its external surface is engaged by the O-ring 38 which is thereby deformed into sealing engagement with the terminal portion 3a as well as into sealing engagement with the internal surface of the section 35 of the sleeve 34 and/or with the wall 36 of the portion 44 and/or with the protuberance 39 to thus prevent leakage of a fluid which is then free to flow from the nipple 3a into the terminal portion 1a or in the opposite direction. Insertion of the nipple 3a into the connector 7 and sleeve 34 is completed when the radially extending flanks 15b, 16b of the pallets 15, 16 snap behind the radial flank 5b of the retainer 5 on the pipe 3.

When the terminal portions 1a, 2a of the hoses 1, 2 are properly secured to the connectors 7, 8 and to the respective sleeves 34 in a manner as shown in FIG. 5 for the terminal portion 1a, connector 7 and the respective sleeve 34, the connectors 7, 8 are ready to be assembled with the holder 9. Such assembling step takes place before the deforming members 10, 11 are introduced between the arms 13, 14 of the respective connectors 7, 8 by moving in the directions indicated in FIG. 1 by arrows 43. The collars 29 are slipped onto the cylindrical portions 12 from the front ends of the respective connectors 7, 8 so that they slide over the rings 17, thereupon over the arms 13, 14, and thereupon over the conical parts 44a of the portions 44 with attendant deformation of the collars before the median portions of the collars enter the respective grooves 26 and the end portions 33 of such collars snap behind the ramps 32 on the respective external stops 31. If the angular position of the connector 7 and/or 8 is such that the end portions 33 of the collars 29 cannot immediately engage the corresponding ramps 32, the connector 7 and/or 8 is turned relative to the respective collar 29 to an extent which is required to move it to the angular position which is shown in FIGS. 2 and 3.

The next step involves insertion of the deforming members 10, 11 in directions which are indicated by the arrows 43 of FIG. 1, and the coupling device is then ready to be connected with the nipples 3a, 4a of the pipes 3 and 4. Insertion of the deforming members 10, 11 between the respective pairs of arms 13, 14 involves some spreading of the arms during the initial stage of insertion, namely when the shoulders 20, 21 move along the inner sides of the arms 13, 14. The arms 13, 14 are thereupon caused to move toward each other due to their innate elasticity so that their inner sides engage the respective guide faces 18 and 19. The improved coupling device is then ready to be affixed to the nipples 3a and 4a. These nipples pass through the oval openings of the respective deforming members 10, 11 and their penetration into the respective connectors 7, 8 and sleeves 34 is completed when the radial flanks 15b, 16b of the pallets 15, 16 engage the radial flanks 5b, 6b of the respective retainers 5, 6. The conical flanks 5a, 6a enable the respective pallets 15, 16 to move apart during the last stage of insertion of the nipples 3a, 4a into the connectors 7, 8 just before the radial flanks 15b, 16b are free to engage the respective radial flanks 5a, 6a.

The purpose of the flexible uniting members or webs 30 is to compensate for eventual departure of the distance between the nipples 3a, 4a from a prescribed or optimum distance. These uniting members can undergo a certain amount of deformation which is amply sufficient to compensate for eventual tolerances of the heat exchanger W and its pipes 3, 4. Thus, the improved coupling device can be put to use even though the pipes 3, 4 are rigid with the housing of the heat exchanger W and even if the distance between such pipes is not an optimum distance. The same holds true if the pipe 3 is not exactly parallel to the pipe 4, i.e., the holder 9 can readily compensate for such inaccuracies in the making of the heat exchanger W. The radii of curvature of the arcuate uniting members 30 can be varied to a considerable extent in order to compensate for the aforediscussed tolerances. Moreover, the uniting members 30 can be twisted if the pipe 3 is not exactly parallel to the pipe 4. Since the free ends 33 of the collars 29 face each other and the free ends of one of these collars face the free ends of the other collar, the collars can enter the grooves 26 of the respective cylindrical portions 12 and their free ends 33 can properly engage the stops 31 of the respective cylindrical portions 12 even if the mutual spacing of the nipples 3a, 4a is such that the connectors 7 and 8 must be disposed in immediate proximity to and must actually touch each other.

Once the terminal portions 1a, 2a of the hoses 1, 2 are properly secured to the respective connectors 7, 8 and the arms 13, 14 of these connectors properly engage the guide faces 18, 19 of the respective deforming members 10, 11, the assembly of the connectors 7, 8 with the nipples 3a, 4a involves a single step which can be carried out by an attendant or by a robot (arrows 45 in FIG. 1). This is important and desirable when the improved coupling device is to be used in motor vehicles, i.e., the assembly of motor vehicles can be automated to a considerable extent because at least one step of attaching a plurality of hoses to a plurality of pipes need not be performed by hand.

If the holder 9 is not applied to the connectors 7 and 8, each of these connectors can be used (with the corresponding sleeve 34, deforming member 10 or 11 and O-ring 38) as a simple hose coupling in a manner as described and claimed in the aforementioned commonly owned copending patent application Serial No. of Hohmann et al. The holder 9 can be detached from the cylindrical portions 12 of the connectors 7, 8 in a particularly simple and convenient manner if the circumferential length of the grooves 26 is less than the distance of the end portions 33 of a collar 29 from each other. All that is necessary is to turn the connector 7 or 8 through 180° relative to the respective collar 29, and the connector is then ready to be separated from the corresponding collar in response to minimal spreading of such collar. The connector 7 or 8 can be turned in the respective collar 29 by engaging and turning the hose 1 or 2 behind the respective cylindrical portion 12. Such turning of the hose 1 or 2 is possible if the other terminal portion of the hose is disconnected from a nipple or the like, not shown, or if the hose 1 or 2 is sufficiently long and is capable of undergoing a certain amount of twisting while its other terminal portion remains connected to its nipple. Turning of the connector 7 or 8 relative to the respective collar 29 causes the suitably inclined faces of end portions 33 of the respective collar to ride over the adjacent ramps 32 with attendant slight spreading of the collar. Such spreading suffices to ensure that the collar 29 can slide over the rib 27 or 28 of the respective cylindrical portion 12.

If the uniting members 30 are relatively long, the collars 29 can be separated from the respective cylindrical portions 12 in response to requisite flattening or opening up of the members 30 which is necessary to move the end portions 33 of the collars apart so that the collars can be slipped off the respective cylindrical portions 12 in the radial direction of the connectors.

Figure 6:
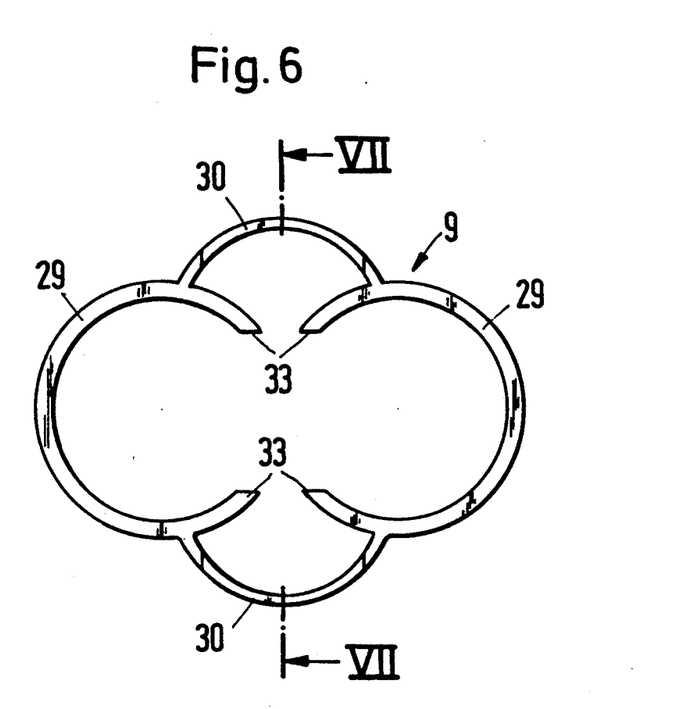
FIG. 6 is a front elevational view of the holder which forms part of the improved coupling device.

It is further possible to modify the holder 9 of FIG. 6 in such a way that each of the collars 29 is turned through an angle of 180°, i.e., that the end portions 33 of each collar continue to be adjacent each other but the end portions 33 of one of the collars are remote from the end portions 33 of the other collar. The connectors 7, 8 can be readily inserted into such collars by the expedient of turning each connector through 180° relative to the angular position of FIG. 1 and by thereupon forcing the cylindrical portion 12 of the thus turned connector to pass between the end portions 33 of the respective collar 29. In order to remove the cylindrical portions 12 from their collars 29, the respective connectors 7, 8 are turned through 180° so that the grooves 26 are disposed between the end portions 33 and the cylindrical portions 12 can be withdrawn from the adjacent collars in response to some (if any) expansion or opening up of the collars. The just described modified holder is somewhat less versatile than the holder 9 of FIG. 6 because the connectors 7, 8 cannot be moved into actual contact with each other when their cylindrical portions 12 are received in the corresponding collars 29, i.e., the minimum distance of the connectors 7, 8 from each other corresponds to twice the radial thickness of the median portion of a collar 29.

If the connectors 7, 8 are to be separated from the respective pipes 3, 4, the deforming members 10, 11 are simply moved radially of the connectors 7, 8 in response to the application of forces in directions indicated by arrows 43. This results in a movement of the corresponding pallets 15, 16 away from each other and in disengagement of the radial flanks 15b, 16b from the respective radial flanks 5b, 6b. Thus, the nipples 3a, 4a can be extracted from the respective connectors 7 and 8. Shifting of the deforming members 10, 11 in the directions of arrows 43 results in a movement of guide faces 18, 19 along the inner sides of the respective arms 13, 14 and the cam faces 22, 23 thereupon cause the respective arms to move their pallets 15, 16 away from each other to an extent which is necessary to move the pallets radially of and outwardly beyond the respective retainers 5 and 6. The connectors 7, 8 are then ready to be separated from the respective nipples 3a, 4a by moving counter to the directions which are indicated by the arrows 45.

An important advantage of the improved coupling device is that the holder 9 is separable from the connectors 7 and 8. This renders it possible to utilize each of these connectors as a constituent of a simple hose coupling which can be employed to separably but fluid-tightly secure the terminal portion (1a or 2a) of a hose (1 or 2) to the nipple (3a or 4a) of a single pipe (3 or 4). In other words, once the holder 9 is detached from the connector 7 or 8, the thus freed connector can be utilized in a manner as disclosed in the aforementioned copending patent application Ser. No. 07/788,822 of Hohmann et al.

Another important advantage of the improved coupling device is that the collars 29 of its holder 9 can be readily secured to and readily disengaged from the connectors 7 and 8. Furthermore, the uniting members 30 enable the collars 29 to properly engage two connectors 7, 8 which are located at a greater or lesser radial distance from each other (and which can actually touch each other) as well as to properly engage two connectors which are not exactly parallel to one another (because the nipples 3a, 4a are not exactly parallel). All this contributes to greater versatility of the improved coupling device.

The utilization of a holder 9 with arcuate uniting members 30 also contributes to versatility of the holder and of the entire coupling device. Moreover, the entire holder 9 can be mass produced in available machines and at a reasonable cost. The holder 29 need not be overly sturdy, as long as it can maintain the connectors 7, 8 in requisite positions for attachment to the nipples 3a, 4a and as long as it can undergo a certain amount of deformation which is necessary to separate or reattach the connectors 7, 8 and/or to change the mutual positions and/or the orientation of the connectors in order to compensate for eventual departure of the mutual spacing and/or inclination of the nipples 3a, 4a relative to each other from an optimum spacing and/or from an optimum inclination.

Though it suffices to provide the holder 9 with a single uniting member 30, it is presently preferred to employ a plurality of uniting members in order to enhance the stability of the holder and to ensure that the connectors 7, 8 can be reliably held in optimum or desired positions relative to each other such as are necessary if the nipples 3a, 4a are parallel to each other and are disposed at a prescribed distance from one another. Alternatively, and if the holder 9 is provided with a single uniting member 30, the latter is stiffer than the uniting members of a pair of such members so that a single uniting member can maintain the collars 29 in optimum positions relative to each other.

As mentioned before, it is presently preferred to orient the collars 29 in a manner as shown in FIG. 6, i.e., so that the end portions 33 of one of the collars confront the end portions 33 of the other collar. This ensures that the holder 9 does not include any parts between the two pairs of end portions 33 and, therefore, the connectors 7, 8 can actually abut each other when their cylindrical portions 12 are received in the corresponding collars 29. The placing of uniting members 30 radially outwardly of the end portions 33 of the collars 29 ensures that the members 30 are out of the way, i.e., that they do not interfere with rapid introduction of cylindrical portions 12 into or with rapid extraction of cylindrical portions 12 from the respective collars. The illustrated uniting members 30 are mirror images of each other, and each such member can exhibit the same flexibility.

Though it is possible to utilize uniting members 30 which are separately produced parts and are subsequently bonded or otherwise secured to the collars 29, the illustrated one-piece holder 9 is preferred because it can be mass produced at a low cost.

The grooves 26 constitute optional but desirable and advantageous features of the connectors 7 and 8. Such grooves ensure that the cylindrical portions 12 of the connectors can be separably held by the collars 29 in optimum positions for convenient insertion of nipples 3a, 4a into the respective connectors. The provision of connectors wherein the external surfaces include the aforediscussed conical portions 44a contributes to simplicity of introduction of collars 29 into the respective grooves 26.

An advantage of the feature that the grooves 26 extend along arcs of less than 360° is that the thickness of a substantial portion of each connector can be reduced accordingly. This entails considerable savings in the material of the connectors and results in a reduction of their weight without affecting the accuracy of positioning of cylindrical portions 12 relative to the respective collars 29. Furthermore, and as already described hereinbefore, the provision of relatively short arcuate grooves 26 renders it possible to conveniently insert or remove the cylindrical portions 12 by the simple expedient of turning the corresponding connectors through angles of approximately 180°. The stops 31 ensure that the connectors 7, 8 can be maintained in predetermined angular positions relative to the collars 29 when the coupling device is ready to be attached to the nipples 3a and 4a. The ramps 32 exhibit the advantage that the connectors 7, 8 can be caused to change their angular positions in response to the exertion of a relatively small force, namely a force which is required to cause the end portions 33 of the collars 29 to ride over the respective ramps 32.

The rings 17 and the deforming members 10, 11 are somewhat similar to those which are described and shown in the aforementioned commonly owned copending patent application Ser. No. 07/591,562 of Spors et al.

The improved coupling device is susceptible of many additional modifications without departing from the spirit of the invention. For example, the coupling device can be simplified by omitting the rings 17 and the deforming members 10, 11. Thus, each connector then merely comprises the two portions 12, 44 and two arms 13, 14 with pallets 15, 16. In order to disengage the pallets 15, 16 from the respective retainers 5, 6, an operator then employs a suitable tool, such as a screwdriver or the like. Alternatively, the coupling device can be made without the rings 17 but is furnished with the deforming members 10, 11 to facilitate separation of the arms 13, 14 from the respective retainers 5, 6. Still further, the holder 9 can be replaced with a holder having more than two collars so that it can separably couple more than two connectors.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A device for separably coupling terminal portions of a first set of two tubular components with terminal portions of a second set of two tubular components, one for each component of the first set, comprising tubular connectors, one for each component of the first set and the respective component of the second set; and a flexible holder for said connectors, said holder and said connectors having means for separably securing said holder to at least one of said connectors, said holder comprising a discrete collar for each of said connectors and each of said collars extending along an arc of at least 180°, said holder further comprising two flexible uniting members connecting said collars to each other.

2. The device of claim 1, wherein said collars are deformable and can be applied around the respective connectors by snap action, said securing means including first sections on said connectors and second sections on said collars.

3. The device of claim 2, wherein said collars are substantially C-shaped.

4. The device of claim 1, wherein each of said uniting members is an arcuate web.

5. The device of claim 1, wherein said collars have pairs of end portions and each end portion of one of said collars confronts and is adjacent an end portion of the other of said collars.

6. The device of claim 5, wherein said end portions form part of said securing means.

7. The device of claim 1, wherein said collars are disposed in a common plane.

8. The device of claim 7, wherein said collars are substantial mirror images of each other.

9. The device of claim 1, wherein said uniting members are rigid with said collars.

10. The device of claim 1, wherein said connectors have peripheral surfaces with circumferentially extending grooves for the respective collars.

11. The device of claim 1, wherein said securing means comprises first sections including stops on said connectors, said collars having end portions arranged to abut the stops of the respective connectors and constituting second sections of said securing means.

12. The device of claim 11, wherein the sections of at least one of said first and second sections include ramps extending in substantial parallelism with the axes of said tubular connectors when the collars of said holder are secured to the respective connectors, said collars being deformable to enable said end portions to ride over the respective stops in response to angular displacement of said connectors and the respective collars relative to each other whereby the sections of the other of said first and second sections and said ramps move relative to each other in the circumferential direction of said connectors.

13. The device of claim 1, wherein the first components have external retainers and said connectors have flexible arms with pallets arranged to engage said retainers in response to insertion of the terminal portion of each first component into the respective connector.

14. The device of claim 13, wherein each connector comprises two elastically deformable arms which are disposed substantially diametrically opposite each other, said arms having free ends and said pallets extending substantially radially inwardly from the free ends of the respective arms.

15. The device of claim 14, wherein each of said connectors further comprises an elastically deformable ring connecting the ends of the respective arms, each of said retainers having a predetermined outer diameter and each of said rings having an oval internal surface including two first portions adjacent the respective pallets and spaced apart from each other a first distance less than said outer diameter in undeformed condition of the ring, each of said internal surfaces further having two second portions located opposite each other, angularly offset relative to the respective first portions and spaced apart from each other a second distance exceeding said outer diameter in undeformed condition of the respective ring.

16. The device of claim 15, further comprising a deforming member for each of said connectors, each deforming member being disposed between the arms of the respective connector and being movable transversely of the respective connector between a first position in which the pallets of the respective arms are spaced apart a distance greater than said outer diameter and a second position in which the respective arms are free to move their pallets nearer to each other so that such pallets can engage the respective retainers.

17. The device of claim 16, wherein said deforming members are elongated and have external cam faces engageable with the respective arms, said deforming members further having external abutments which engage the respective arms in the second positions of said deforming members.

18. The device of claim 17, wherein said deforming members further comprise pairs of substantially parallel external guide faces between the respective abutments and the respective cam faces.

19. A device for separably coupling terminal portions of a first set of two tubular components with terminal portions of a second set of two tubular components, one for each component of the first set, comprising tubular connectors, one for each component of the first set and the respective component of the second set; and a flexible holder for said connectors, said holder and said connectors having means for separably securing said holder to at least one of said connectors, said holder comprising a discrete collar for each of said connectors and each of said collars extending along an arc of at least 180°, said holder further comprising two flexible uniting members connecting said collars to each other, said connectors having peripheral surfaces with circumferentially extending grooves for the respective collars, each of said connectors having a first end and a second end and an outer diameter which gradually increases from one of said ends toward the respective groove.

20. A device for separably coupling terminal portions of a first set of two tubular components with terminal portions of a second set of two tubular components, one for each component of the first set, comprising tubular connectors, one for each component of the first set and the respective component of the second set; and a flexible holder for said connectors, said holder and said connectors having means for separably securing said holder to at least one of said connectors, said holder comprising a discrete collar for each of said connectors and each of said collars extending along an arc of at least 180°, said holder further comprising two flexible uniting members connecting said collars to each other, said connectors having peripheral surfaces with circumferentially extending grooves for the respective collars and at least one of said grooves extending along an arc of less than 360°.

* * * * *